(12) United States Patent
Marchesotti et al.

(10) Patent No.: US 7,764,846 B2
(45) Date of Patent: Jul. 27, 2010

(54) ADAPTIVE RED EYE CORRECTION

(75) Inventors: Luca Marchesotti, Grenoble (FR); Jutta K. Willamowski, Grenoble (FR); Marco Bressan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 896 days.

(21) Appl. No.: 11/637,351

(22) Filed: Dec. 12, 2006

(65) Prior Publication Data
US 2008/0137944 A1 Jun. 12, 2008

(51) Int. Cl.
G06K 9/40 (2006.01)
(52) U.S. Cl. ............... 382/274; 382/254; 382/275
(58) Field of Classification Search ............... 382/254, 382/274, 275
See application file for complete search history.

(56) References Cited

U.S. PATENT DOCUMENTS

| | | |
|---|---|---|
| 5,130,789 A | 7/1992 | Dobbs et al. |
| 5,153,632 A | 10/1992 | Maida et al. |
| 5,202,719 A | 4/1993 | Taniguchi et al. |
| 5,404,192 A | 4/1995 | Konishi et al. |
| 5,432,863 A | 7/1995 | Benati et al. |
| 5,801,943 A | 9/1998 | Nasburg |
| 5,852,675 A | 12/1998 | Matsuo et al. |
| 5,990,973 A | 11/1999 | Sakamoto |
| 6,009,209 A | 12/1999 | Acker et al. |
| 6,016,354 A | 1/2000 | Lin et al. |
| 6,252,976 B1 | 6/2001 | Schildkraut et al. |
| 6,278,491 B1 | 8/2001 | Wang et al. |
| 6,577,751 B2 | 6/2003 | Yamamoto |
| 6,718,051 B1 | 4/2004 | Eschbach |
| 6,728,401 B1 | 4/2004 | Hardeberg |
| 6,895,112 B2 | 5/2005 | Chen et al. |
| 6,980,691 B2 | 12/2005 | Nesterov et al. |
| 7,171,044 B2 | 1/2007 | Chen et al. |

(Continued)

FOREIGN PATENT DOCUMENTS

EP 1480168 A2 11/2004

(Continued)

OTHER PUBLICATIONS

Burges, A Tutorial on Support Vector Machines for Pattern Recognition, *Data Mining and Knowledge Discovery*, vol. 2, No. 2, pp. 121-167 (Kluwer Academic Publishers) 1998.

(Continued)

*Primary Examiner*—Tom Y Lu
(74) *Attorney, Agent, or Firm*—Fay Sharpe LLP

(57) ABSTRACT

An image processing method takes as its input, a patch of an image where a candidate red-eye has been detected. The method includes classifying the patch with a classifier trained to assign the patch either to a default first class of patches associated with a standard correction of the candidate red-eye or to at least one second class of patches associated with a modified correction of the candidate red-eye. The modified correction may be designed to reduce a risk of degradation of the image for the second class of patches. The classification optionally includes determining a confidence level associated with the classification. If the image is classified into the at least one second class and the confidence level, where determined, exceeds a threshold, the modified correction is applied to the patch, otherwise, the standard correction is applied.

22 Claims, 5 Drawing Sheets

U.S. PATENT DOCUMENTS

| | | | |
|---|---|---|---|
| 7,269,303 B2 * | 9/2007 | Miller et al. | 382/305 |
| 7,343,028 B2 | 3/2008 | Ioffe et al. | |
| 2002/0126893 A1 | 9/2002 | Held et al. | |
| 2002/0150292 A1 | 10/2002 | O'Callaghan | |
| 2002/0176623 A1 | 11/2002 | Steinberg | |
| 2003/0044178 A1 | 3/2003 | Oberhardt et al. | |
| 2003/0142285 A1 | 7/2003 | Enomoto | |
| 2003/0202105 A1 | 10/2003 | Gaubatz et al. | |
| 2004/0184670 A1 | 9/2004 | Jarman et al. | |
| 2004/0213476 A1 | 10/2004 | Luo et al. | |
| 2004/0228542 A1 | 11/2004 | Zhang et al. | |
| 2004/0240747 A1 | 12/2004 | Jarman et al. | |
| 2005/0047655 A1 | 3/2005 | Luo et al. | |
| 2005/0117173 A1 | 6/2005 | Kugo | |
| 2005/0232481 A1 | 10/2005 | Wu | |
| 2006/0056687 A1 | 3/2006 | Brandt | |
| 2006/0072815 A1 | 4/2006 | Wu et al. | |
| 2006/0098867 A1 | 5/2006 | Gallagher | |
| 2006/0120599 A1 | 6/2006 | Steinberg et al. | |

FOREIGN PATENT DOCUMENTS

| | | |
|---|---|---|
| WO | WO 9917254 A1 | 4/1999 |

OTHER PUBLICATIONS

Calvo, et al., A Comparative Study of Principal Component Analysis Techniques, *Australian Conference in Neural Networks*, Brisbane (1998).

DeLaTorre, et al., Robust Principal Component Analysis for Computer Vision, *Intl. Conf on Computer Vision* (2001).

Duch, et al., Distance-based Multilayer Perceptrons, *CIMCA*, pp. 75-80 (ed. M. Mohammadian, IOS Press, Amsterdam) (1999).

Duch, et al., Minimal Distance Neural Methods, *Proc. I.J. CNN*, pp. 1299-1304 (1998).

Hardeberg, Digital Red Eye Removal, *Journal of Imaging Science and Technology*, vol. 46(4) pp. 375-381 (2002).

Ioffe, Red Eye Detection with Machine Learning, *ICIP*, 2003.

Mikolajczyk, et al., A Performance Evaluation of Local Descriptors, *IEEE Conf. on Pattern Analysis and Machine Intelligence*, vol. 27, No. 10 Oct. 2005.

Omachi, et al., A Fast Algorithm for a *k*-NN Classifier Based on Branch and Bound Method and Computational Quantity Estimation, In *Systems and Computers in Japan*, vol. 31, No. 6, pp. 1-9 (2000).

Pires, Robust Linear Discriminant Analysis and the Projection Pursuit Approach—Practical Aspects Developments in Robust Statistics, *Intl. Conf. on Robust Statistics*, Heidelberg 2001, pp. 317-329 (Springer-Verlag 2003).

Povinelli, et al., Time Series Classification Using Gaussian Mixture Models of Reconstructed Phase Spaces, *IEEE Transaction on Knowledge and Data Engineering*, vol. 16, No. 6, Jun. 2004, pp. 779-783.

*Red-Eye Correction: Using Point to Point*, www.jasc.com/support/learn/tutorials/archive/paintshoppro/red-eye2.asp?pg=1 (Feb. 4, 2005).

*Remove "Red-Eye" Effect From Your Images*, www.vicman.net/redeye (Feb. 4, 2005).

Singh, et al., Nearest Neighbour Strategies for Image Understanding, *Proc. Workshop on Advanced Concepts for Intelligent Visions Systems* (ACIVZ '99), Baden-Baden, (Aug. 2-7, 1999).

Smith, et al., VisualSEEK: A Fully Automated Content-Based Image Query System, *ACM Multimedia*, 1996.

Smolka, et al., Towards Automatic Redeye Effect Removal, *Pattern Recognition Letters*, vol. 24(11) pp. 1767-1785 (2003).

Willamowski, Probabilistic Automatic Red Eye Detection and Correction Pattern Recognition, *ICPR 18th Intl. Conf.*, vol. 3, pp. 762-765 (2006).

U.S. Appl. No. 11/145,710, filed Jun. 3, 2005, Fan, et al.

U.S. Appl. No. 11/311,991, filed Dec. 20, 2005, Willamowski, et al.

L.Zhang, Y.Sun, M.Li, H.Zhang, Automated Red Eye Detection and Correction in Digital Photographs, *ICIP*, 2004.

R.Schettini, F.Gasparini, F.Chazli, A Modular Procedure for Automatic Redeye Correction in Digital Photos, *Electronic Imaging Science and Technology*, IS&T/SPIE 16th International Symposium, 2004.

R.Ulichney, Perceptual-Based Correction of Photo Red-Eye, *Proceedings of the 7th IASTED International Conference on Signal and Image Processing*, Honolulu, HI, Aug. 2005.

M.Chuat, Generic Visual Categorizer, *Xerox Research Centre Europe*, licensing@xrce.xerox.com., Apr. 2006.

G.Csurka, C.R.Dance, L.Fan, J.K.Willamowski, C.Bray, Visual Categorization with Bags of Keypoints, *Xerox Research Centre Europe*, Date: 2004.

M.Gaubatz, R.Ulichney, Automatic Red-Eye Detection and Correction, *IEEE ICIP*, 2002.

J.Y.Hardeberg, Red Eye Removal Using Digital Color Image Processing, *Conexant Systems, Inc.*, Date: 2001.

Phong Model for Specular Reflection, *Phong Model—Specular Reflection*, http://www.siggraph.org/education/materials/HyperGraph/illumin/specular_Highlights/phong, 2006.

Delphi3D, *Phong for Dummies*, http://www.delphi3d.net/articles/viewarticle.php?article=phong.htm, 2006.

\* cited by examiner

ADAPTIVE RED EYE CORRECTION

CROSS REFERENCE TO RELATED PATENTS AND APPLICATIONS

The following copending applications, the disclosures of which are expressly incorporated herein by reference in their entireties, are mentioned:

U.S. application Ser. No. 11/145,710, filed Jun. 3, 2005, entitled "RED EYE DETECTION AND CORRECTION," by Lixin Fan, et al.; and U.S. application Ser. No. 11/311,991, filed Dec. 20, 2005, entitled "RED EYE DETECTION AND CORRECTION," by Jutta Willamowski, et al.

BACKGROUND

The present exemplary embodiment relates to image processing. It finds particular application in connection with the automated correction of digital images for red-eye.

Red-eye is a common problem in photographic images and can occur whenever a flash is used. Light reflecting from the human retina makes the eyes' pupils appear red instead of their natural color. Recognizing this problem, camera manufacturers have attempted to minimize or inhibit red-eye by equipping cameras with the ability to emit one or more pre-flashes of light immediately prior to completion of the actual photograph. These pre-flashes are intended to constrict the subject's pupils to minimize light incident on the retina and reflected therefrom. Although cameras equipped with pre-flash hardware can alleviate red-eye problems, they are not always well received since the red-eye artifact is not always prevented. They also tend to consume much more energy, induce a significant delay between pushing the button and taking the photograph, and result in people blinking the eyes. Red-eye has become more prevalent and severe as cameras have been made smaller with integrated flashes. The small size coupled with the built-in nature of the flash requires placement of the flash in close proximity to the objective lens. Thus, a greater portion of the reflected light from a subject's retinas enters the object lens and is recorded.

The automatic correction of the red-eye effect in digital photography generally involves two steps. First, a detection step distinguishes red-eye from non red-eye (or other) regions in an image. Second, a correction step attempts to reverse the red-eye effect. Recently, the focus has been on the detection stage. However, even where the detection is performed with reasonable accuracy, it is not uncommon for the correction step to degrade the image to a point where it would have been better to leave the red-eye unaltered.

In one method, an operator visually scans all images and marks those images including red-eye for further processing. The processing typically involves modifying the red pixels in the identified red-eye. Efforts to eliminate or reduce operator involvement have resulted in automated processes that attempt to detect red-eye based upon color, size, and shape criteria. When a red-eye is detected, the automated process applies a correction to the red area. To correct red-eyes, most approaches desaturate the pixels in the detected red-eye regions. Some also modify their luminance. In some approaches, the red-eye regions are smoothed around the edges to provide a more natural looking transition between the corrected and uncorrected portions of the image.

In correcting red-eyes, the altering of chromatic information on the eye may result in a degradation of the original image and the final result is not acceptable for the user. One reason for this is that the correction may remove glint. Glint refers to the typically small, white specular reflections in the eye region of a photograph which give the eye a sparkle. Without the sparkle, eyes can appear dead or flat rendering the photograph unappealing. Glint results from the curvature of the cornea and typically occurs under flash light although it is also found in photographs taken in natural lighting.

Recognizing the importance of glint, some methods artificially insert a glint in the photograph if, after the standard correction, the corrected eye lacks a glint. In one approach a template of an eye is used. The template is composed of a pupil, an iris and possibly other elements, such as glint or sclera. These components are first located within the red-eye region and then corrected differently and separately.

INCORPORATION BY REFERENCE

The following references, the disclosures of which are expressly incorporated herein in their entireties by reference, are mentioned:

Methods for recognizing or addressing red-eye are disclosed, for example, in U.S. Pat. Nos. 5,432,863, 5,990,973, 6,009,209, 6,016,354, 6,278,401, 6,278,491, 6,718,051, 6,728,401, Published Application Nos. 2004/0184670, 2006/0098867, 2006/0120599, and the references cited therein.

U.S. Pat. No. 6,895,112 entitled RED EYE DETECTION BASED ON RED REGION DETECTION WITH EYE CONFIRMATION, by Chen, et al., discloses a system which initially identifies pixels that correspond to the color of red-eye within an image. A determination is then made as to whether these identified pixels and surrounding areas are part of an eye or not part of an eye. Those identified pixels that are determined to be part of an eye are the detected red-eye regions. The system includes a filter which identifies groups of pixels, based on a set of rules, which are to be output to an eye confirmation module as detected regions. An eye confirmation module receives the detected regions from the region detection module and identifies, for each of the detected regions, whether the detected region is part of an eye.

U.S. Pat. No. 6,980,691, entitled CORRECTION OF "RED-EYE" EFFECTS IN IMAGES, by Nesterov, et al. discloses a method of automatically identifying a red-eye defect in a region of an image which includes classifying pixels within the region according to a ratio of the respective values of a first color channel and a second color channel. A red-eye defect is identified when the value of the ratio exceeds a predetermined value. Templates of colors or templates for features (such as glint, pigmentation, or artistic features) may be added to identified regions to be corrected for red-eye.

U.S. Publication No. 2004/0184670, published Sep. 23, 2004, entitled "DETECTION CORRECTION OF RED-EYE FEATURES IN DIGITAL IMAGES," by Jarman, et al., discloses a method of correcting red-eye features in a digital image which includes generating a list of possible features by scanning through each pixel in the image searching for saturation and/or lightness profiles characteristic of red-eye features. For each feature in the list, an attempt is made to find an isolated area of correctable pixels which could correspond to a red-eye feature. Each successful attempt is recorded in a list of areas. Each area is then analyzed to calculate statistics and record properties of that area, and validated using the calculated statistics and properties to determine whether or not that area is caused by red-eye. Areas not caused by red-eye and overlapping areas are removed from the list. Each area remaining is corrected to reduce the effect of red-eye. More than one type of feature may be identified in the initial search for features.

U.S. Published Patent Application 2004/0228542, published Nov. 18, 2004, entitled MODIFICATION OF RED EYE-EFFECT IN DIGITAL IMAGE, by Zhang, et al. discloses a process for automatic artifact compensation in a digital representation of an image. The process includes detecting, by a processor, regions corresponding to facial images within the digital representation. Red-eye regions within the detected regions are located by the processor and the located red-eye regions are automatically modified.

U.S. Published Patent Application 2005/0047655, entitled DETECTING AND CORRECTING REDEYE IN AN IMAGE, by Luo, et al., discloses a method of processing an input image which includes detecting red-eye pixel areas in the input image, segmenting glowing red-eye pixel areas from non-glowing red-eye pixel areas, and re-coloring regions of the segmented glowing red-eye pixel areas. A given red-eye pixel area is segmented as a glowing red-eye pixel area when the relative numbers of red-eye pixels and non-red-eye pixels in an oval glint correction region inscribed in the given red-eye pixel area exceeds a predetermined threshold.

Lei Zhang, Yanfeng Sun, Mingjing Li, Hongjiang Zhang, "AUTOMATED RED EYE DETECTION AND CORRECTION IN DIGITAL PHOTOGRAPHS," ICIP 2004, discloses an automatic approach for detecting and correcting red eyes in digital images. In order to detect red eyes in a picture, a heuristic algorithm is first adopted to detect a group of candidate red regions, and then an eye classifier is utilized to confirm whether each candidate region is a human eye. Thereafter, for each detected red eye, a correction algorithm applies a correction. In cases where a red eye cannot be detected automatically, another algorithm is also provided to detect red eyes manually with the user's interaction by clicking on an eye.

BRIEF DESCRIPTION

Aspects of the exemplary embodiment relate to a method and apparatus for processing an image. In one aspect, an image processing method includes, for a patch of an image where a candidate red-eye has been detected, assigning the patch to a first class or to one or more second classes. The assignment includes classifying the patch with a classifier with a classifier trained to assign a patch to a first class of patches associated with a standard correction of the candidate red-eye or to one or more second classes of patches associated with modified corrections of the candidate red-eye. The modified correction is designed to reduce a risk of degradation of the image for the second class of patches. Where the patch is assigned to one or more second classes, the modified correction is applied to the candidate red-eye. Where the patch is assigned to the first class, the standard correction is applied to the candidate red-eye.

In another aspect, an image processing apparatus includes a detection component which, for a plurality of pixels in a digital image comprising an original image or a modified resolution image derived therefrom, assigns a probability that a pixel is within a red-eye, and identifies whether a patch of the image contains a candidate red-eye based on the assigned probabilities. A classifier classifies a patch of the digital image in which a candidate red-eye is identified into one of a first class of images and at least one second class of images, the first class being associated with a standard correction of the candidate red-eye, the at least one second class being associated with a modified correction of the candidate red-eye, the modified correction designed to reduce a risk of degradation of the digital image for the second class of images and optionally assigns a level of confidence to the classification. A correction component, based on the classification by the classifier, applies either the modified correction or the standard correction to the candidate red-eye.

In another aspect, an image processing method includes, for each of a plurality of pixels of a digital image, assigning a probability to the pixel of the pixel being in a red eye as a function of a color of the pixel. The method further includes identifying whether a patch of the digital image includes a candidate red-eye based on the assigned probabilities of pixels in the patch. For a patch which is identified as including a candidate red-eye, the method includes automatically classifying the patch to a first class of images associated with a standard correction of the candidate red-eye or to at least one of a plurality of second classes of images, each of the second classes being associated with a modified correction of the candidate red-eye and determining a confidence level associated with the classification. Where the image is classified into the at least one second class and where determined, the confidence level exceeds a threshold value, the modified correction is applied to the patch. Otherwise, the method includes applying the standard correction to the patch.

In another aspect, a classifier for digital images is provided which takes as input a digital image in which a patch includes a candidate red-eye, the classifier having been trained to identify images for which a modified correction of the candidate red-eye results in less degradation of the patch of the image than a standard correction of the candidate red-eye and to classify the image into either a first class for which the standard correction is to be applied or at least a second class for which the modified correction is applied.

DETAILED DESCRIPTION

Aspects of the exemplary embodiment relate to an apparatus and to a method for correction of red-eyes in photography and to a classifier suitable for use in such an apparatus and method.

The automatic correction of the red-eye effect in a digital image includes a detection stage which distinguishes red-eye from non red-eye (or other) regions in an image prior to a correction stage which is applied with the object of reducing the red-eye effect. Red-eye correction techniques often suffer from a tendency to cause image degradation. This can be due to the detection of false positives or, even in the case of correct detection, to an inadequate correction technique.

The exemplary apparatus and method enable such problems to be reduced by considering a general set of potential degradations due to erroneous red-eye correction and the conditions in which they take place. The exemplary embodiment focuses on the correction step, taking as input data, an image together with the detected red-eye regions. While specific detection methods are described herein for identifying candidate red-eyes and specific default correction methods for correction of the identified candidate red-eyes, these are provided as examples only and it is to be appreciated that the exemplary method is not limited to any specific method for detection of red-eyes or any default correction method.

Figure 1:
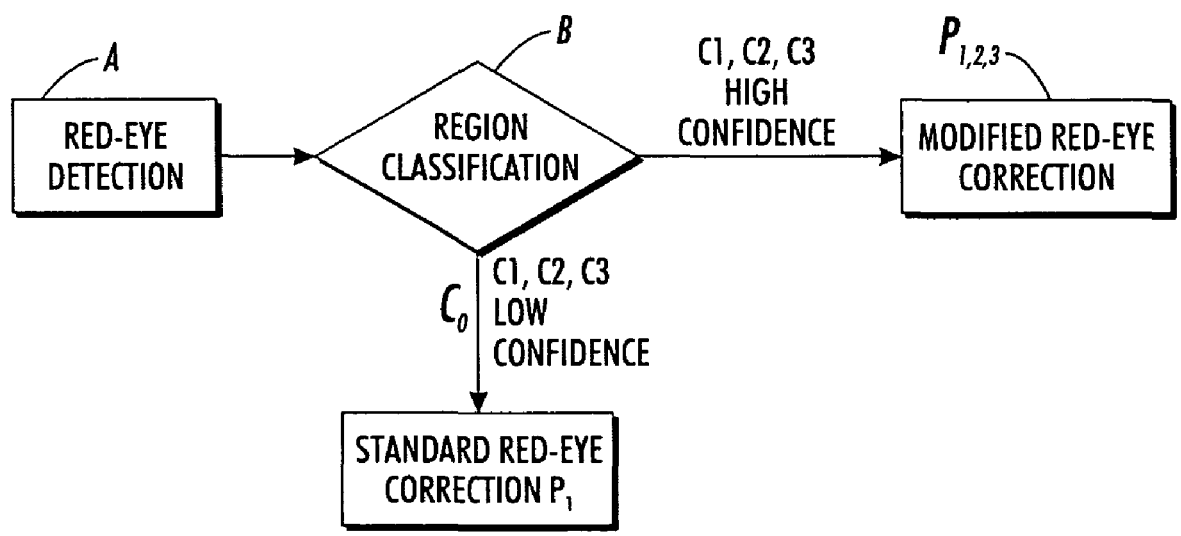
FIG. 1 is a simplified flow diagram illustrating one aspect of an exemplary method for correction of red-eye in digital images.

FIG. 1 is a flow diagram which illustrates a general outline of the exemplary method. The method takes as input the results of a red-eye detection method illustrated as A. Digital images where a candidate red-eye has been detected are then subjected to step B, which involves classifying a patch of the image containing the candidate red-eye. The classes are selected to identify whether a standard correction or a modified correction should be applied. Based on a classification of the patch, and optionally a determination of a confidence level associated with the classification, the image region corresponding to the patch may be assigned to one or more modified correction classes $C_1$, $C_2$, and/or $C_3$. The patch is then processed according to one or more modified corrections $P_1$, $P_2$, and/or $P_3$ associated with these classes. Otherwise, a standard correction class $C_0$ is assigned and a standard correction $P_0$ is applied. In the exemplary embodiment, the three modified correction classes correspond to an enlarged pupil class $C_1$, in which the standard correction tends to resulting in a correction which extends beyond the actual pupil area of the original image, a poorly defined pupil class $C_2$, in which the border tends to appear poorly defined after a standard correction, as compared with the original image, and a class $C_3$ in which the appearance of glint is lacking or reduced in the standard correction. However, it is to be appreciated that fewer, more or different classes corresponding to other types of degradation may be employed.

Above-mentioned application Ser. No. 11/145,710 discloses a fully or substantially automated computer implemented process for identifying and correcting patches of photographic digital images corresponding to red eyes. The method disclosed is probabilistic in the sense that a red-eye detection module automatically assigns probabilistic values not binary values to pixels in candidate red-eye regions. In particular, the detection module attributes to each image pixel, a red-eye probability $P(x,y)$ on any suitable scale between maximum and minimum values (e.g., a scale of from 0 to 1), with values in between being possible. Unlike other red-eye detection methods whose outputs are binary (either yes, it's a red-eye, or no, it is not a red-eye), these probabilistic values may result from a combination of different pixel features, e.g., reddish, luminance, and spatial circularity, which have been found to correlate with the region being a red-eye in practice. The resulting probabilistic values are then used in a correction module to determine the amount of correction to apply to each pixel. Application Ser. No. 11/311,991 adds a further refinement to this method which includes applying a classifier trained to distinguish red-eye pixels from those in other parts of the face or non face regions of an image and modifies the probability map accordingly.

The detection step A of the exemplary method disclosed herein can be based on the detection steps of either of these applications. These methods have suitable correction results due to their soft approach and also provide a probability map P for red-eye detection that can be used as a feature for the classification step.

The exemplary apparatus may include a soft detection component for determining a probability map of values of $P(x,y)$ as described in these applications. Alternatively, the method and apparatus may employ another detection method in which pixels of an image are assigned a probability of being in a red-eye based on a color of the pixel and one or more additional factors based on the surrounding pixels.

The correction step described in application Ser. Nos. 11/145,710 and 11/311,991 involves modifying the red channel values $R(x,y)$ of the pixels of the original image by a correction which is dependent on the probability value $P(x,y)$ for that pixel and may also take into account the original green and blue channel values. Where the probability $P(x,y)$ is low, indicating a low probability of being in a red-eye, the original red color of the pixel is substantially unchanged. Where the probability $P(x,y)$ is high, i.e., a probable red-eye, the red channel value is reduced. In particular, the corrected red channel value $R(x,y)_{corrected}$ may be determined according to the expression:

$$R(x,y)_{corrected}=[(1-P(x,y))R(x,y)]+[P(x,y)*F(x,y)] \qquad \text{Eqn. 1}$$

where $F(x,y)$ is a factor which takes into account the green and blue channel values $G(x,y)$ and $B(x,y)$, respectively, and may be determined according to the expression:

$$F(x, y) = \frac{G(x, y) + B(x, y)}{2} \qquad \text{Eqn. 2}$$

Thus, for example, for a pixel where $P(x,y)=0.25$, $R(x,y)=220$, $G(x,y)=130$, $B(x,y)=90$, then $F(x,y)=110$ and $R(x,y)_{corrected}=0.75*220+0.25*110=192.5=193$ when rounded to the nearest selectable value. However, it is contemplated that other correction expressions may be used for determining $R(x,y)_{corrected}$ as a function of the original channel value(s) and the probability $P(x,y)$. and/or that the green and blue channel values may also be adjusted as a function of $P(x,y)$.

The exemplary apparatus and method disclosed herein may utilize a correction method as described in application Ser. Nos. 11/145,710 and 11/311,991 and outlined above as a default (standard) correction, to be applied where the image is placed in the class for which a default (standard) correction is determined to be more appropriate.

In various aspects, the method includes, for any given candidate red-eye region, pattern classification techniques to determine which potential degradation is most likely to occur and basing the red-eye correction procedure upon the assigned class. In aspects of the exemplary embodiment, the method considers two effects perceivable on eye surfaces when exposed to flash light: glint, the white specular reflections, and redness at center of the eye. The exemplary method enables a reduction in red-eye artifacts which can adapt its correction strategy to the image content by making use of a classification algorithm.

The exemplary embodiment finds application in photograph processing such as in commercial photofinishing of digital photographic images and scanned images as well as other digital image processing applications, such as in digital still cameras or other handheld devices. The method allows automated red-eye correction without the need for manual verification.

In one aspect of the exemplary embodiment, an apparatus for correction of red-eyes includes a red-eye detection component for identifying candidate red-eyes in images and a classifier trained to classify a patch of the image containing a candidate red-eye identified by the detection component into a class selected from a plurality of classes and a correction component which applies a correction procedure to the candidate red-eye which is based on the class.

In another aspect of the exemplary embodiment, a method of correcting an image to reduce the effect-of red-eye includes classifying a patch of the image which contains a candidate red-eye into a class selected from a set of classes based on features of the patch and applying a correction to the patch based on the class into which the patch is classified. Depending on the confidence level of the assignment, a correction method $P_1, P_2, \ldots P_k$ specific to the class of degradation or a standard correction $P_0$ may be applied. The exemplary method generally improves the correction of problematic cases, without affecting those where the standard correction work well.

The exemplary apparatus enables fully automated detection and correction of red eyes in the image processing stage, allowing the elimination of pre-flash hardware and its associated disadvantages. The images to be processed may be generated by a digital imaging device, such as digital camera, scanner, digital video recorder, or the like.

Figure 2:
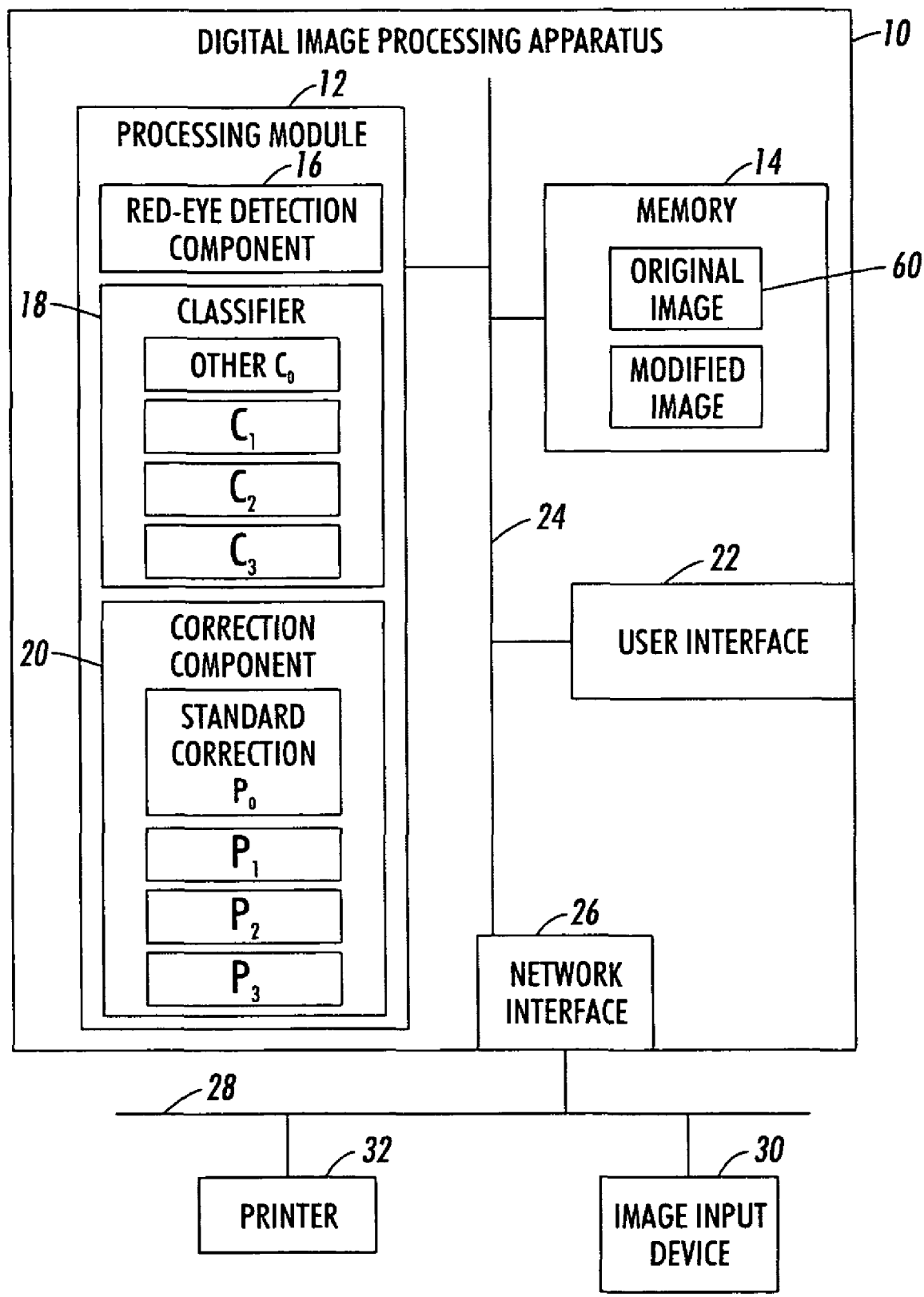
FIG. 2 is a functional block diagram of an exemplary apparatus for detection and correction of red-eyes in accordance with another aspect of the exemplary embodiment.

A functional block diagram of an exemplary detection and correction apparatus 10 is shown in FIG. 2. The apparatus 10 includes software which may be incorporated into the digital imaging device or may be stored on a suitable image processing apparatus separate from the digital imaging device, such as a personal desktop computer, laptop, or a dedicated image processing system, such as a photofinishing apparatus. The images to be processed by the apparatus 10 are in digital form or are converted to digital form prior to processing. The image data can be defined by a plurality of pixel values expressed in terms of a color space, such as a red, green, blue (RGB) color space, or may be converted thereto.

The apparatus 10 includes a processing module 12, such as a central processing unit (CPU), and associated memory 14. The processing module 12 includes various processing components, herein illustrated as a red-eye detection component 16, a classifier 18, and a correction component 20. Images to be processed by the processing module are stored in memory 14, which may also store the instructions executed by the processing module components 16, 18, 20 for performing the exemplary method described herein.

The detection component 16 may execute instructions for identifying one or more regions of an input image which contain a candidate red-eye. In the exemplary embodiment, the detection module may assign pixels of the input image (or a reduced resolution version thereof) a probability of being in a red-eye P(x,y). The assigned probability P(x,y) of being in a red eye may be based on one or more pixel features, such as color, luminance, and/or circularity of an area in which the pixel is located. Based on the assigned probability values, the detection component may execute instructions for identifying a region of contiguous pixels as a candidate red-eye, based on the assigned probabilities and for identifying an image region which has as its center the candidate red-eye. For example, tests may be performed on a region of contiguous pixels each having a threshold red-eye probability in order to filter out regions which do not pass the tests, for example, because they are too small or too large, in relation to the image, or insufficiently circular to constitute a red-eye. For the eliminated regions, the probabilities may be set to zero or some relatively low probability value. The pixels in any remaining region or regions within the image (candidate red-eye regions) retain at least some probability of being in a red-eye and are spaced from other candidate red-eye region(s) by areas which have been assigned low or zero probability P(x,y) of being in a red-eye. Further details of an exemplary detection method are provided in application Ser. Nos. 11/145,710 and 11/311,991.

The classifier module 18 receives as its input, the output of the red-eye detection module 16. The classifier module 18 is trained, prior to actual use, to classify patches from a training set of images in which previously identified candidate red-eye regions have been corrected with the standard correction method $P_0$. The classes may include a first class $C_0$ in which the standard correction provides an acceptable correction and one or more degradation classes $C_1, C_2, C_3$, in which the standard correction failed to give an adequate correction (in general, images in these classes were considered by observers to have been degraded by the correction process). In the exemplary embodiment, three degradation classes are identified: 1) a class of patches in which the corrected region extended beyond the edge of the pupil, 2) a class in which the pupil shape was poorly defined, and 3) a class in which the correction removed or diminished the appearance of a glint in the image. The classifier 16 executes instructions for classifying patches into either the default class $C_0$ or into one or more of degradation classes $C_1, C_2, C_3$ based on features of a patch of the image containing a candidate red-eye.

The correction component 20 executes instructions for correction of the candidate red-eye based on the classification by the classifier 18. In general, the correction component provides at least two correction modes, a first, standard correction mode $P_0$ and one or more modified correction modes $P_1, P_2, P_3$, each tailored to address a degradation problem commonly associated with the corresponding degradation class $C_1, C_2, C_3$ to which the image is assigned. The operation of the classifier 18 and correction component 20 will be described in greater detail below.

The memory 14 is accessible to the processing components 16, 18, 20 for storing the outputs of the steps and the original and modified images. Optionally a user interface 22 in communication with a user input device (not shown) comprising one or more of a screen, an alphanumeric keyboard, keypad, mouse, joystick, or other cursor control device, allows a user to view the corrected image and accept or decline the correction. The processing components 16, 18, 20 may communicate with each other and with memory 14 and user interface 22 via a data/control bus 24. It will be appreciated that while the components 16, 18, 20 are shown as part of a single processor 12, and may all be instantiated in a single chip, the components may be separate from one another and communicate via a wired or wireless link. Optionally, a network interface 26 allows the apparatus 10 to communicate with other devices via a computer network 28, such as a local area network (LAN) or wide area network (WAN), or the internet, and may comprise a modulator/demodulator (MODEM). The apparatus 10 may receive images and/or output corrected images from an image input device 32 via the interface 26. In one embodiment, the apparatus 10 forms a part of a workflow processing system and the network 28 includes a printer 32 for printing output images, or documents comprising corrected images, on tangible print media such as paper.

The memory 14 may represent any type of computer readable medium such as random access memory (RAM), read only memory (ROM), magnetic disk or tape, optical disk, flash memory, or holographic memory. In some embodiments, the processor 12 and memory 14 may be combined in a single chip.

As will be appreciated, FIG. 2 is a high level functional block diagram of only a portion of a digital image processing apparatus 10 and that the apparatus may include additional image processing components.

Figure 3:
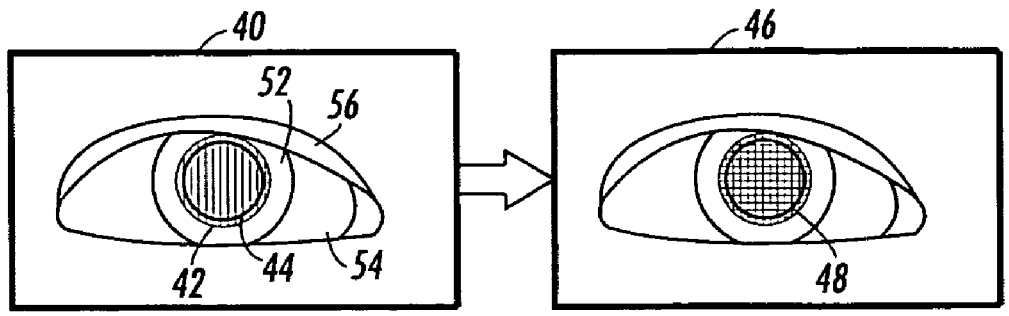
FIG. 3 illustrates a patch of an image containing a red-eye which extends beyond the pupil and after correction with a standard red-eye correction method.
Figure 4:
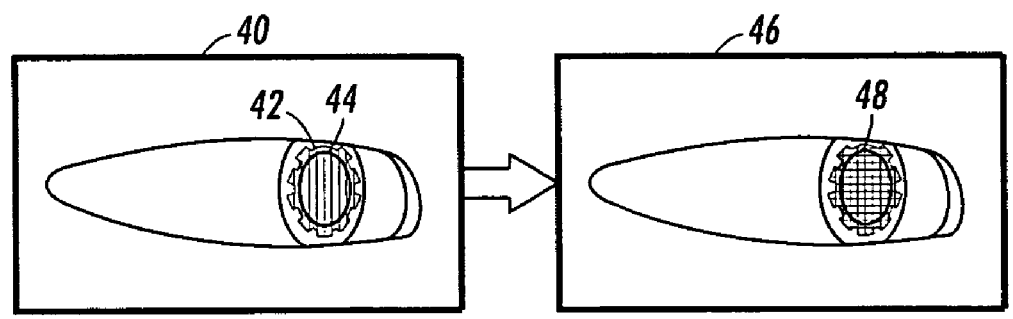
FIG. 4 illustrates a patch of an image containing a red-eye which is poorly defined around a border of a pupil, and after correction with the standard red-eye correction method.
Figure 5:
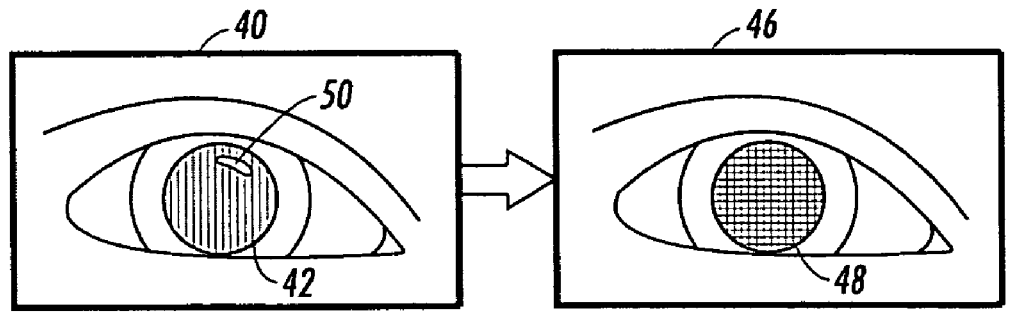
FIG. 5 illustrates a patch of an image containing a red-eye which looses its glint during correction with the standard red-eye correction method.

FIGS. 3-5 illustrate schematically the effect of the standard correction on the three modification classes. For images in class $C_1$, when a patch 40 of the original image is corrected with the standard correction method $P_0$, the reddish region 42 corresponding to the actual pupil 44 (illustrated as a circle) extends beyond the pupil 44 and in the same patch 46 of the corrected image, the pupil area 48 appears much larger than it should, due to correction of reddish regions outside the actual pupil area (FIG. 3).

For images in class $C_2$, when a patch 40 of the original image is corrected with the standard correction method $P_0$, the reddish region 42 corresponding to the actual pupil 44 renders the pupil area 48 poorly defined in the same patch 46 of the corrected image (FIG. 4).

For images in class $C_3$, when a region 42 of the original image corresponding to the pupil contains a glint 50, the patch 46 corrected with the standard correction method $P_0$ has no glint or the glint is diminished in appearance (FIG. 5). This class may also include images in which no glint is detected in a region of the original image which is identified as encompassing the cornea.

Prior to training the classifier 18, the red-eye corrected patches 46 in the training set are assigned to one or more of the classes $C_1$, $C_2$, $C_3$, based on visual observations or to default class $C_0$. Features of the patches in each of the classes are then identified. During training of the classifier 18, an objective is to learn to recognize patches whose features allow them to be placed in a particular class and optionally to assign a confidence level to the classification (in some embodiments the confidence level may be factored into the classification). In this way, patches of new images from outside the training set which are assigned to one or more of the classes $C_1$, $C_2$, $C_3$ associated with a visually observed degradation can be assigned a correction which reduces the impact of the degradation which would occur if a standard correction $P_0$ were to be applied.

The patches 40, 46 used in training the classifier and in classifying new images may each have as their center, a candidate red-eye 42. The patches 40, 46 may be larger than the candidate red-eye region 42 and, in general, are large enough to encompass an eye (assuming that the candidate red-eye 42 is indeed a red eye). In general, the patches 40,46 are smaller than the entire image area. For example, the patches may be sized to encompass the red-eye 42 (pupil area), the iris 52, at least part of the white part of the eye (sclera) 54 at one or more sides of the iris, and optionally part of the skin 56 surrounding the eye.

The exemplary method allows a correction to be specifically tuned for the output of the classifier 18. If the classifier exhibits uncertainty, a default correction $P_0$ may take place. The result is a method that can be adapted to a wide variety of red-eye correction systems, generally with an improvement over the default (standard) correction $P_0$. In various embodiments, the method employs the output of a soft red-eye detection component 16 as input to the exemplary classification method.

Figure 6:
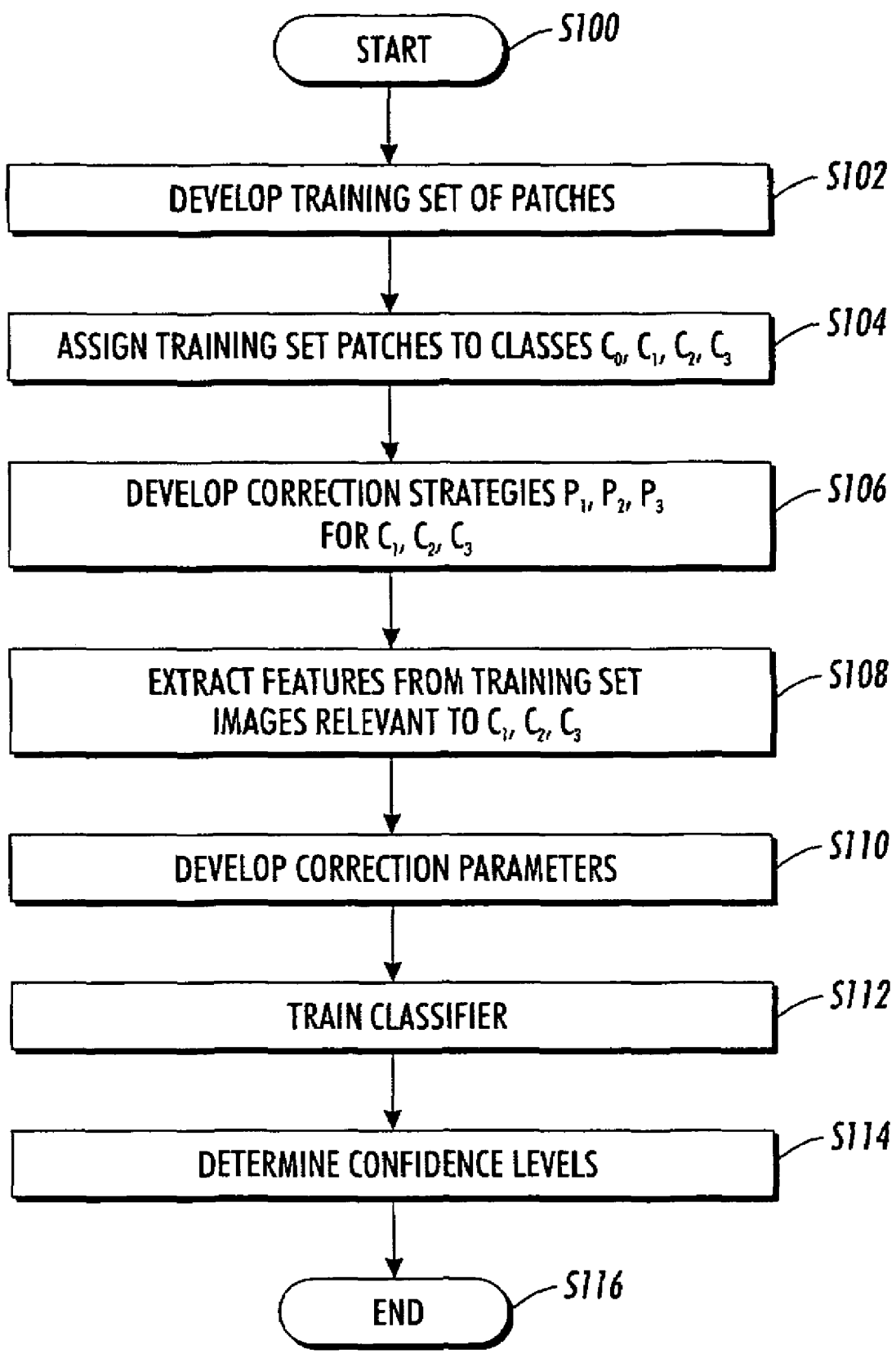
FIG. 6 is a flow diagram illustrating a method of developing the apparatus of FIG. 2.

With reference to FIG. 6 an exemplary method of forming the processor 12 of FIG. 2 is illustrated. As will be appreciated, the method may include fewer, more, or different steps and need no proceed in the order illustrated.

The method begins at step S100. At step S102, a training set of images is developed. The training set may include a large number of processed images which have been corrected for red-eyes using a selected standard correction process. The standard correction process is generally one which is to be adopted as a default correction process $P_0$ for the exemplary method. Included among the training set are images which appear degraded, at least to the eye of a group of observers, when visually examined. The training set may also include images which do not appear to exhibit a degradation and are generally considered by the observers to constitute an improvement over the uncorrected original image.

At step S104, the images in the training set are assigned by the observers to either a standard class $C_0$, for images where the correction is considered satisfactory, or to a degradation class denoted by $C_1, C_2, \ldots C_k$. In the illustrated embodiment, three degradation categories are identified, labeled $C_1$, $C_2$, and $C_3$, although it is to be appreciated that fewer or more degradation classes may be established, and/or that a given class may include subclasses. Each degradation class represents a visually observed potential degradation which is introduced by applying the correction method $P_0$. In the illustrated embodiment, these correspond to the following degradations:

$C_1$: includes images where the corrected red-eye extends beyond the original pupil, e.g., into the iris, sclera, or eyelid, giving an unrealistic correction. This may result from the detection step identifying parts of the iris outside the pupil as red-eye pixels.

$C_2$: includes images where the pupil of the corrected red-eye is poorly defined giving an unrealistic correction. This may result where the detection is not accurate in the border between the pupil and the iris.

$C_3$: includes images where the glint in the corrected red-eye is less apparent than in the original image. The pupil region tends to be uniform and glint is "masked" by redness.

These examples are common to most conventional red-eye correction systems and largely due to the fact that the correction methods take a single approach, regardless of the particular situation. In particular, for $C_1$ it can be seen that the correction method often corrects pixels in lashes, whereas in $C_2$ the pupil-iris border tends to be very fragmented and perceptually unpleasant. In $C_3$, glint is not present in the pupil and the correction produces "dead" eyes.

In general a training set image may be placed in more than one of classes $C_1, C_2, \ldots C_k$. For example, an image where the glint has been removed and which also includes a corrected region which extends noticeably beyond the pupil may be classed in two degradation classes $C_1$ and $C_3$.

At step S106, a specific correction strategy $P_1, P_2, \ldots P_k$ for each degradation category $C_1, C_2, \ldots C_k$ is developed. In the illustrated embodiment, three correction strategies $P_1, P_2, P_3$ are developed, one for each of $C_1$, $C_2$, and $C_3$. Although the correction strategies $P_1, P_2, \ldots P_k$ may share some common correction schemes, they generally differ in at least one respect from each other of the correction schemes $P_1, P_2, \ldots P_k$. $P_k$ can be equal to $C_0$ if a default correction is to be applied to a particular class. The object is to provide corrections schemes $P_1$, $P_2$, $P_k$ which will improve or equal the default approach $P_1$. To provide a useful benefit over a method in which the default correction scheme is applied to each class $C_1, C_2, \ldots C_k$, at least one of the correction schemes $P_1, P_2, \ldots P_k$ is not equal to $P_0$.

In order to correct the degradations, the following correction strategies may be associated to each degradation class $C_i$ with i=1, 2, 3.

$P_1$: apply parameterized morphological operations.
$P_2$: apply a template-based chromatic pupil correction.
$P_3$: insert a specular reflection (i.e., glint) into the pupil.

At step S108 features are extracted from the training set images manually assigned to each class. This step may include computation of global and local red-eye features and localization of salient eye subparts.

At step S110 correction parameters are determined and adjusted based on the typologies of the eye (e.g., defined in relation to features, such as eye dimension, shape of the pupil, iris chromatic information) which are relevant for the selected categories $C_1, C_2, \ldots C_k$. The features enable parameterization of the correction strategies.

At step S112, the classifier 18 is trained on the training set images assigned to each class using those features found to be most reliable in distinguishing between the classes. In the exemplary embodiment, this enables at least a provisional classification of a red-eye region into one or more of $C_1, C_2 \ldots C_k$ or to default class $C_0$. The exemplary classifier 18 is a heuristic classifier since it allows features to be chosen which are related to specific degradations. In the more general case, any pattern classifier could be trained.

At step S114, a measure for assessing a confidence for classification results is optionally defined. In one embodiment, the confidence level may be used to determine whether a standard correction $P_0$ or one or more corrections $P_{1,2,3}$ are applied to a candidate red-eye. Where the confidence level that a candidate red-eye is correctly classified exceeds a threshold value an appropriate one or more of $P_1, P_2, P_3$ may be applied. The threshold may vary according to the correction to be applied, since different correction schemes have more or less effect on the image. Alternatively or additionally, the amount of correction may be correlated with the level of confidence.

Confidence levels may be determined by visually examining images which have been provisionally assigned to the categories $C_1, C_2, C_3$ by the trained classifier. Features which are less able to correctly place an image in the correct class are given less weight in determining the confidence level while features which strongly correlate with a particular class are given more weight in determining the confidence level.

The method ends at step S116.

Figure 7:
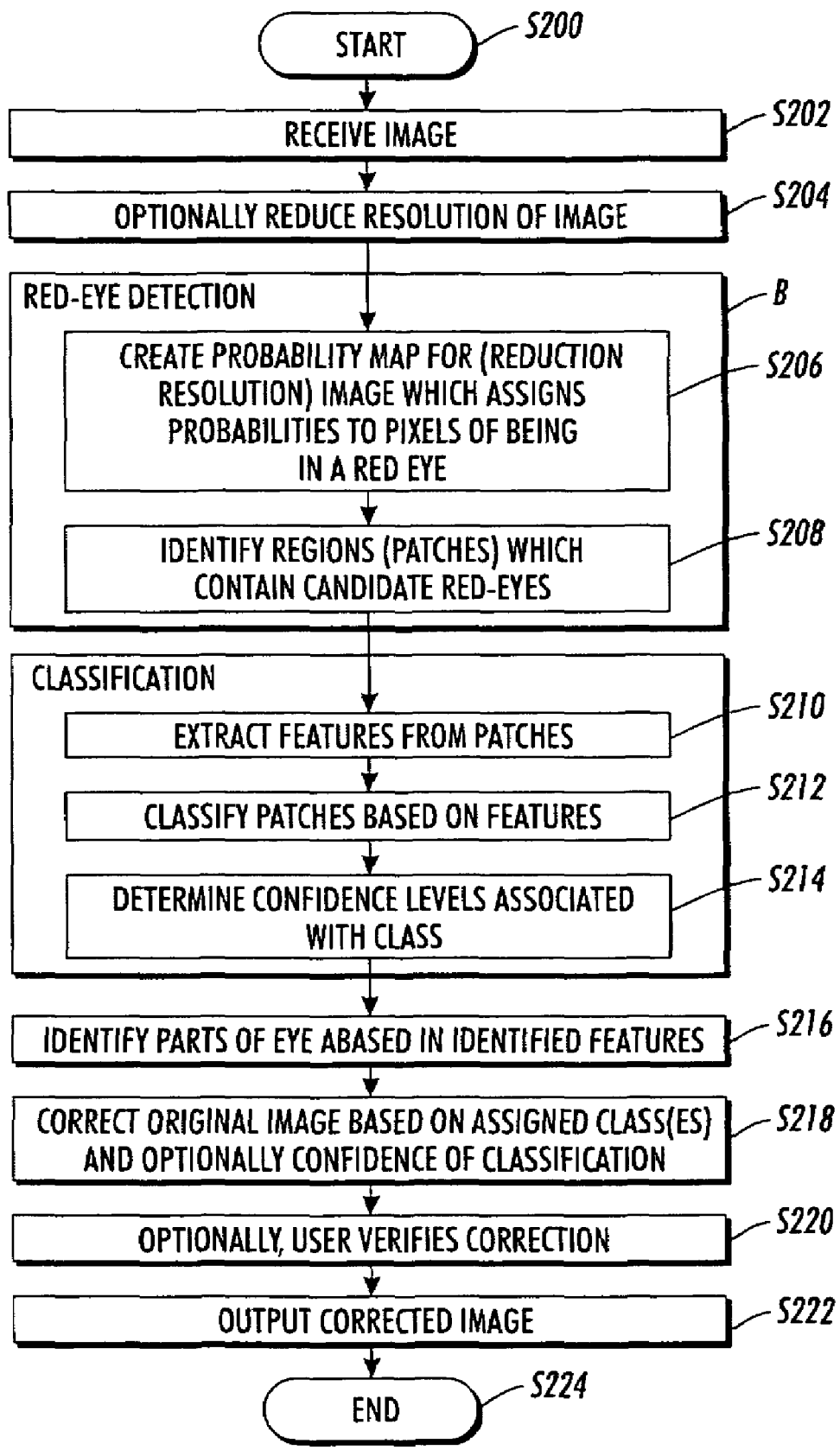
FIG. 7 is a flow diagram illustrating a method of detection and correction of red-eyes in accordance with one aspect of the exemplary method.

FIG. 7 illustrates an exemplary method of image processing with a classifier trained by the method of FIG. 6. The exemplary method is suited to correction of red-eyes detected by any suitable method. As will be appreciated, the method may include fewer, more, or different steps and need no proceed in the order illustrated. The method begins at step S200.

At step S202 an original image 60 to be processed is received by the processor 12 and may be stored in memory 14.

At step S204, the resolution of the image may be modified to facilitate processing. For example, a reduced resolution image may be generated.

Red-eye detection is performed on the image (corresponding to step A of FIG. 1). This step may include various substeps, depending on the factors considered in identifying a red-eye such as creating a probability map for the image (or reduced resolution image) which for each pixel assigns a probability P(x,y) of the pixel being in a red-eye (Step S206) and identifying any patches which contain candidate red-eyes (Step S208). The probability P(x,y) may be expressed on a scale having values between maximum and minimum values (e.g., the probability of being in a red-eye may take any value on a "gray" scale between 1 and 255), with higher probabilities being assigned to those pixels in the candidate red-eye regions than in surrounding regions not considered to contain candidate red-eyes. In one embodiment, Step S208 may include examining contiguous regions of pixels of the image having at least a threshold of redness and optionally also luminance (brightness) to assess whether the region is sufficiently circular to constitute a red-eye. Redness may be a function solely of the red channel component of the pixel or may take into account the relative amounts of red (R), green (G) and blue (B) components. Further processing may be conducted to eliminate regions from consideration which are of a size or shape which renders them unlikely to be red-eyes. Any remaining regions are considered to be candidate red-eyes.

Patches 40 identified as containing a candidate red-eye 42 may be rectangular or other suitable shape and may be larger than the candidate red-eye that they contain, e.g., have horizontal and vertical dimensions of about three times (or more) that of the candidate red-eye which they contain, with the candidate red-eye at the geometric center of the region. In general, each patch is smaller than the entire image area.

The assigned probabilities represent the probability that the pixel is within a red-eye and may take into account various properties of the pixel and the region in which it is located, such as the redness of the pixel, luminance of the pixel, circularity of the region, size of the region, contrast with surrounding regions, and combinations thereof. In one embodiment the assigned probabilities take into account the output of one or more classifiers trained to distinguish eyes, and red-eyes in particular, from other regions of a face and/or other small, red objects which may be found in images, as disclosed, for example, in application Ser. No. 11/311,991.

In the classification stage B, any patch identified at step S208 as comprising a candidate red-eye may be classified by the classifier 18. In the exemplary embodiment, this results in the patch being assigned to the standard class $C_0$, or to one or more of the degradation classes $C_1, C_2, \ldots C_k$.

At step S210, features are extracted from the patch 40. Based on the extracted features, the region is at least provisionally assigned to the appropriate class(es) $C_1, C_2, \ldots C_k$ or $C_0$. At step S212, patches are assigned to a class based on the identified features. At Step S214, confidence levels $L_1, L_2, \ldots L_k$ for each of the assigned classes may be determined (alternatively, this step may be subsumed into step S212).

At step S216 the different subparts of an eye namely pupil, iris, and glint may be located based on the features extracted at step S210.

At step S218 a correction scheme for the assigned degradation class(es) may be applied to the original image if the confidence level $L_1, L_2, \ldots L_k$ for the respective class $C_1, C_2, \ldots C_k$ is above a designated threshold $T_1, T_2, \ldots T_k$ for that class. Otherwise, a standard correction $C_0$ may be applied.

The standard correction $P_0$ may be substantially as described application Ser. Nos. 11/145,710 and 11/311,991, i.e., using Equation 1 above, or other suitable correction which may be based on the assigned probability and the value of one or more of the color channels for the pixel.

The correction $P_1$ may be based on $P_0$ but modify the correction such that pixels near the border of the pupil receive less correction, for example, by multiplying P by a factor which progressively increases in value (e.g., from 0-1) from the outside toward the center of the pupil. The correction $P_2$ may be based on $P_0$ except in a region at the border of the pupil, where a template correction is applied to increase the definition of the pupil. The correction $P_3$ may be based on $P_0$ except for the insertion of a glint in an appropriate region of the cornea.

Optionally at step S220, a user may verify the corrected image, although in general, this step is not necessary.

At step S222, the image may be output for printing or for further digital image processing or formatting in a document. The method ends at step S224.

The method illustrated in FIG. 7 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Some of the steps will now be described in greater detail with respect to specific embodiments. In the features extraction step (step S210), eye degradations may detected and described with global and local features for each red-eye region. Global features characterize the whole region, while local features are related to specific regions within a region, e.g., regions corresponding to the pupil and iris.

For example, global features my include one or more of:

a. A pixel wise probability map P(x,y) output by the red-eye detection step.

b. Projection histograms representing the shape and circularity information of the pupil. These histograms add up the pixel probabilities P(x,y) in horizontal and vertical directions, each histogram generally representing a line of pixels of width one pixel. Based on these histograms, a measure of horizontal and vertical spread indices $s_x$ and $s_y$ (in pixels), an aspect ratio s=norm ($s_x/s_y$), where norm ($s_x/s_y$) is a normalized value which varies between 0 and 1, and a circularity measure $$c = \frac{4 \cdot \pi \cdot A}{L_P^2},$$

where A is the area in pixels of the region and $L_P$ is the perimeter of the region in pixels), for the red-eye contained in the region can be obtained.

c. A pixel wise probability map $P_g(x,y)$ for glint detection based on joint analysis of regions with circular shape and homogeneous chromatic components. For example, pixels of the map may be assigned a value $P_g$ according to the expression:

$$P_g(x, y) = \left\| \bar{q}(x, y) - \frac{1}{|R_{x,y}|} \sum_{(i,j) \in R_{x,y}} \bar{r}(i, j) \right\| \quad \text{Eqn. 3}$$

where $\bar{q}(x,y)=[c^{xy}_G, c^{xy}_B]$ and $\bar{r}(i,j)=[c^{ij}_G, c^{ij}_B]$ with $c^{ij}_G, c^{ij}_B$ being values for G and B channels in the i-th image row and j-th image column, $R_{x,y}$ is a circular region centered in pixel x, y and $|R_{x,y}|$ is the number of pixels in the region; the radius of $R_{x,y}$ is determined in relation to the circularity measure c. This expression assigns to each pixel a probability value $P_g(x,y)$ which is indicative of whether the pixel forms a part of a region which should be treated as glint. In particular, it favors regions of a substantially circular shape with substantially homogeneous values in the G-B space. This is generally true of actual instances of glint where the glint region is generally circular and is contained within the circular pupil region.

Local features extracted in the feature extraction step are related to specific red-eye pixels regions within the region. A region growing algorithm may first be applied to the probability map P(x,y) to aggregate pixels with similar properties (e.g., with proximity and similar values in the probability map) into homogeneous regions. Generally, a plurality of such homogeneous regions is identified. The number of regions may depend on factors such as the content of the image, the lighting conditions, and the amount of red objects in the image. For each of these homogeneous regions one or more of the following local features may be extracted:

a. The area A covered by the region b. The region's center of mass $x_c, y_c$ (i.e. the region centroid)

c. The lengths $d_x, d_y$ of the minor and major axis of the ellipse with the same normalized second central moments as the region (i.e., the circumscribed ellipse which best fits the considered region)

d. The angle α between the x-axis and the major axis of the ellipse with the same normalized second central moments as the region.

Once global and local features have been extracted, the different subparts of an eye namely pupil, iris, and glint may be located. For example, among the regions evaluated within the local features extraction step, the region minimizing the Euclidean distance to the patch center is chosen as a candidate for representing the pupil. Possible glint regions are localized in $P_g(x,y)$ with heuristics on position (i.e., glint has to be localized within the cornea region) and on dimensions (i.e., glint size is evaluated by scaling the pupil dimension).

Correction Strategies Parameterization

In the exemplary embodiment, three correction strategies $P_{1,2,3}$ are generally sufficient for correction of degradations $C_{1,2,3}$ (step S214) These strategies may be as follows:

$P_1$: Parameterized morphological operations: Parameterized morphological operations first allow the rejection of noisy pixels that were wrongly detected as being a part of a candidate red-eye because they lie outside the pupil. Second the operations allow regularizing of the pupils' shape in order to avoid the introduction of artifacts. Morphological closing of the binarized probability images $P_{(x,y)}$ may be used to achieve this (see, for example, Robert M. Haralik, Linda G. Shapiro *Computer and Robot Vision*, 1992, Addison-Wesley). Considering that eyes have typically an elliptical shape, a structuring element may be selected which approximates a conic (ellipse or circle). Morphological closing is a filtering operation. As with all filters, it has to be parameterized in relation to the input signal. The size of the structuring element (i.e., the kernel, which is the most important part of the filter) represents the parameter to be set. The aspect ratio s is a way to characterize the input signal. The structuring element size (SELS) in pixels may be determined dynamically depending on the circularity measure c, as shown in Table 1.

TABLE 1

| Structuring Element Size (SELS) parameterization | |
|---|---|
| C | SELS |
| 0.8-1 | 0 |
| 0.7-0.8 | 2 |
| 0.6-0.7 | 3 |
| 0.4-0.6 | 4 |
| 0.0-0.4 | 5 |

$P_2$: Template-based Chromatic Pupil Correction in order to smooth the correction on the pupils' borders and to palliate JPEG artifacts, a template-based chroma correction may be applied to red-eye patches. In one embodiment, correction is applied according to a regular distribution, with peak correction occurring at the center of the pupil region and decreasing correction applied towards the edge of the pupil. For example, a Gaussian model fitting the properties of the region identified as pupil is computed, and a smoothed correction is applied. This results in pixels further from the center of the pupil being accorded less correction, on average, than pixels closer to the center.

$P_3$: Pupil Specular Reflection Correction: To avoid the "dead" eye effect that appears when the luminance is too flat over the whole pupil a glint may be inserted. Two models can be used:

a. Gaussian Model: the luminance I over the cornea is modeled using a Gaussian function similar to the one used for the chromatic information correction but with scaled covariance:

$$I(\bar{x}; \bar{\mu}, \overline{\sigma_g}) = \frac{1}{\overline{\sigma_g}\sqrt{2\pi}} \exp\left(-\frac{((\bar{x}-\bar{\mu})\cdot \bar{r})^2}{2\overline{\sigma_g}^2}\right) \qquad \text{Eqn. 4}$$

where $$\overline{\sigma_g} = \left(\frac{\sigma_x}{l}, \frac{\sigma_y}{l}\right) \quad \sigma_x = d_x \text{ and } \sigma_y = d_y,$$

the axes of pupil region ellipse and l is a scaling factor estimated on the typical relation between size of the pupil and size of the glint, $\bar{r}$ is the rotation matrix evaluated from angle α (orientation of the eye with respect to x axis) and $\bar{\mu}$ is the position where the glint is centered (i.e. typically the center of the pupil). When a glint is to be inserted, the luminance in the original image may be modified according to Eqn. 4.

b. Bui Tuong Phong Model: this model takes into account the position of the viewer and it adjusts accordingly the glint reflection. The amount of specularly reflected light seen by a viewer as glint depends on the angle δ between incident light and surface normal vector and the angle φ between the viewer and the reflected ray. Phong's model for luminance I is:

$$I = W(\delta) I_p \cos^n(\phi) \qquad \text{Eqn. 5}$$

where W(δ) is the fraction striking the surface that is specularly reflected, $I_p$ is the intensity of the light source, e.g., flashlight, causing the glint, and n is the Phong specular-reflection exponent. W(δ) is often set to a constant, denoted $k_s$, and referred to as the specular-reflection coefficient or specular reflectivity. An appropriate value for $I_p$ can be derived empirically. In order to apply the Phong model to red-eyes, additional information may be utilized, in particular a template of typical cornea curvature as well as the subject's gaze. When a glint is to be inserted, the luminance in the original image may be modified according to Eqn. 5 within a region determined to represent the cornea.

The Classifier

In the exemplary embodiment, the classifier 18 is heuristic in nature, in particular the following classification rules are applied for classifying patches as $C_1$, $C_2$ and $C_3$:

$C_1$: using the aspect ratio s; if the horizontal profile is too large with respect to the vertical profile (s>$th_s$, where $th_s$ may be in the range of 0-1.4) it can be assumed that there are segmentation problems and pixels outside the red-eye are wrongly detected as red-eye pixels. The patch region is then classed as $C_1$ $C_2$: this classification exploits the circularity measure c; if the red-eye is not sufficiently circular the border between pupil and iris is inaccurate. For example, if c is outside the range 0.6-1, the red-eye may be considered to be not sufficiently circular and the patch classified as $C_2$.

$C_3$: using the glint probability g derived by integrating the probability distribution map $P_g(x,y)$; if g<$th_g$ it is assumed that the glint is missing and the patch is classified as $C_3$. Specifically, the glint probability map can be examined as follows:

1) The probability map is thresholded using a consistent value $th_g$ (which may be about 0.6) for noise removal and a binary mask (mask with 1 or 0 pixel values) is obtained 2) The number $G_{NZ}$ of non zero pixels in the binary mask is determined 3) If $G_{NZ}$ is not zero, it is assumed that a glint is present and that the patch does not need correction, otherwise an artificial glint can be inserted, e.g., using the Gaussian or Bui Tuong Phong Model.

Once one or more degradations $C_i$ are detected, the corresponding correction(s) $P_i$ can be applied.

The Confidence Measure

In order to choose between the default correction method $P_0$ and the eventual parameterized corrections $P_{1,2,3}$, a confidence measure may be evaluated. Where the classifier 18 has been designed using a heuristic approach, a heuristic confidence measure may also be used. In the case of a statistical pattern classification scheme, the confidence measure may be obtained directly, for example, from the conditional probabilities and may optionally be incorporated into the classification step.

In one embodiment, a confidence level obtained from the local and global features is used for ensuring that if the new correction scheme $P_{1,2,3}$ will constitute an improvement over the default method $P_0$. In the design of such a measure, a consideration of the correction importance and associated risk of using the correction(s) $P_{1,2,3}$, rather than the default correction. Table 2 shows an estimate of the risk of further damage to the image when correcting with method $P_i$ and also how much that correction is "desirable" to achieve an acceptable perceptual result on the output image as compared with the use of the default correction $P_0$.

TABLE 2

Correction importance with associated risk when using modified correction schemes

| | Correction Importance | Associated Risk |
|---|---|---|
| $P_1$ | High | Low |
| $P_2$ | Medium | Medium |
| $P_3$ | Medium-High | High |

The confidence measure may be selected to reflect these human observations, i.e., balancing the importance of the correction against the risk of damage if the patch is incorrectly classified. In the case of $C_1$ this is relatively easy, since the benefits of correction are high while the risk of degradation are relatively low so the confidence measure can also be low-resulting in the correction method $P_1$ being applied even in those cases where a relatively low confidence of correct classification is obtained. In general, for correction of $C_2$ the confidence level required may be at least as high as for $C_1$, generally higher than $C_1$ and for $C_3$, generally higher than for $C_2$, since the risks may marginally outweigh the benefits.

In one embodiment, a general confidence measure L may be derived by applying the following expression:

$$L = \frac{1}{1+e^{(\alpha_g(g-\beta))}} + \alpha_b\left(\sqrt{c} + (s)^2\right) \gtreqless th_c \qquad \text{Eqn. 5}$$

where $\alpha_g$ and $\beta$ are parameters that regulate the sigmoid function, g is the glint probability $\alpha_b$ indicates the dimension of the eye, c is the circularity and s is the aspect ratio. If L is less than the designated threshold $th_c$, the confidence is considered to be low and therefore the standard correction method $P_0$ is used. If the confidence is high (above $th_c$) the most appropriate sequence of correction strategies (i.e. $P_1$, $P_2$, and/or $P_3$) is applied.

If there is no glint in the image then any correction to be applied implies using $P_3$. However, considering that the associated risk of inserting the glint is high (i.e., double glint is highly damaging, as well as misplaced glints) a steep sigmoid is used. Then always considering the associated risk, the confidence on circularity and spreading index is weighted accordingly. Additional dimensions of the eye may be taken into account because it is generally safer to correct big eyes where subparts (i.e., glint, pupil) are well identifiable.

Without intending to limit the scope of the exemplary embodiment, the following example demonstrates the effectiveness of providing alternative correction techniques depending on the type of degradation identified.

Example

Patches of images not among those used to train the classifier 18 were corrected using three different correction algorithms:
(1) the present correction algorithm: $P_{1,2,3}$ or $P_0$, as appropriate
(2) a correction method using a standard correction $P_o$ in all cases, as outlined in application Ser. Nos. 11/145,710 and 11/311,991.
(3) a commercial red-eye correction algorithm: $P_A$ It was found present method does not affect cases in which the standard correction $P_o$ works well—i.e., the method utilized $P_o$ when appropriate. The present method avoids degradations related to $C_{1,2,3}$. It was found to provide correction which was preferred by observers to the commercial correction $P_A$. In particular two kinds of tests were carried out in order to compare:
a. (1) vs (2)
b. (1) vs (3)

Qualitative analysis indicated that the presented correction method outperforms (2) and (3). Neither of these methods provides a perceptually preferred correction when the glint is missing. In addition, (3) generally "overcorrects" pupils producing artifacts on the iris whereas (1) "smoothly" handles the border between iris and pupils due to the parameterized Gaussian model. In almost all cases where (2) fails, the present method (1) improves the perceptual quality of the correction. The confidence measure ensures that in cases where degradations do not dramatically affect the eye, the system switches to the low risk correction method $P_0$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing method comprising:
for a patch of an image where a candidate red-eye has been detected, with a processor, assigning the patch to a first class of patches associated with a standard correction of the candidate red-eye or to at least one second class of patches associated with a modified correction of the candidate red-eye, the modified correction designed to reduce a risk of degradation of the image for the second class of patches, the assignment including classifying the patch with a classifier trained to assign a patch to the first class of patches or to the at least one second class of patches;
where the patch is assigned to the at least one second class, applying the modified correction to the candidate red-eye; and
where the patch is assigned to the first class, applying the standard correction to the candidate red-eye.

2. The method of claim 1, wherein when the classifier assigns the patch to the at least one second class, the assignment further includes determining a confidence level associated with the classification and wherein the modified correction is applied when the confidence level exceeds a threshold.

3. The method of claim 2, wherein the at least one second class includes a plurality of second classes and wherein a threshold for a first of the second classes is higher than a threshold for a second of the second classes.

4. The method of claim 2, further comprising, where the patch is classified by the classifier into the second class and where the confidence level does not exceed the threshold, applying the standard correction to the candidate red-eye.

5. The method of claim 1, wherein the second class of images comprises a plurality of second classes and wherein each of the second classes is associated with a respective modified correction.

6. The method of claim 5, wherein the classifier is trained to assign images for which the standard correction tends to result in a first type of degradation to a first of the second classes of images and to assign images for which the standard correction tends to result in a second type of degradation to a second of the second classes of images.

7. The method of claim 5, wherein the second class comprises three second classes.

8. The method of claim 5, wherein the plurality of second classes include at least two classes selected from the group consisting of:
a class which includes patches for which the standard correction has a probability of applying a correction to the candidate red-eye which extends beyond a region corresponding to a pupil;
a class which includes patches for which the standard correction has a probability of generating a pupil of the corrected candidate red-eye with a border which appears more poorly defined than in the original image; and
a class which includes patches for which the standard correction has a probability of producing a corrected image in which a glint in the corrected candidate red-eye is less apparent than in the original image.

9. The method of claim 8, wherein when the patch is assigned to the enlarged pupil class, the modified correction includes determining a correction for pixels of the candidate red-eye based on a color of the pixel and an assigned probability of being in a redeye and a distance from a center of the candidate red-eye, whereby pixels further from the center of the candidate red-eye tend to receive less correction than pixels closer to the center.

10. The method of claim 8, wherein when the patch is assigned to the poorly defined pupil class, the modified correction includes modifying color values of pixels adjacent a border of a region identified as corresponding to a pupil to increase the definition of the border.

11. The method of claim 8, wherein when the patch is assigned to the less apparent glint class, the modified correction includes modifying pixel color values of a region corresponding to a pupil to provide an appearance of a glint.

12. The method of claim 1, further comprising, prior to the classifying:
for each of a plurality of pixels of a digital image or a modified resolution image generated therefrom, assigning a probability to the pixel of the pixel being in a red-eye as a function of a color of the pixel; and
identifying a candidate red-eye patch based on the assigned probabilities of a group of contiguous pixels.

13. The method of claim 1, wherein the standard correction comprises, for each of a plurality of pixels in the patch, determining a correction to apply to the pixel which is a function of the assigned probability that the pixel is within a red-eye and a color of the pixel.

14. The method of claim 1, wherein the classifier is trained with a set of patches which have been manually assigned to either the first class or to at least one of the second classes.

15. The method of claim 1, wherein the classification includes identifying features of the patch based on:
a probability map in which each pixel of at least the patch is assigned a probability $P(x,y)$ of being in a red-eye;
projection histograms derived from the probability map which sum the pixel probabilities $P(x,y)$ in horizontal and vertical directions, each histogram generally representing a line of pixels of width one pixel; and
a probability map $P_g(x,y)$ for glint detection based on analysis of regions with circular shape and homogeneous chromatic components.

16. An apparatus for processing images comprising a processor which executes instructions for performing an image processing method comprising:
for a patch of an image where a candidate red-eve has been detected, assigning the patch to a first class of patches associated with a standard correction of the candidate red-eye or to at least one second class of patches associated with a modified correction of the candidate red-eye, the modified correction designed to reduce a risk of degradation of the image for the second class of patches, the assignment including classifying the patch with a classifier trained to assign a patch to the first class of patches or to the at least one second class of patches;
where the patch is assigned to the at least one second class, applying the modified correction to the candidate red-eye; and
where the patch is assigned to the first class, applying the standard correction to the candidate red-eye.

17. A tangible computer-readable medium on which instructions for performing an image processing method are recorded, the method comprising:
for a patch of an image where a candidate red-eye has been detected, assigning the patch to a first class of patches associated with a standard correction of the candidate red-eye or to at least one second class of patches associated with a modified correction of the candidate red-eye, the modified correction designed to reduce a risk of degradation of the image for the second class of patches, the assignment including classifying the patch with a classifier trained to assign a patch to the first class of patches or to the at least one second class of patches;
where the patch is assigned to the at least one second class, applying the modified correction to the candidate red-eye; and
where the patch is assigned to the first class, applying the standard correction to the candidate red-eye.

18. An image processing apparatus comprising:
instructions stored in memory comprising:
a detection component which, for a plurality of pixels in a digital image comprising an original image or a modified resolution image derived therefrom, assigns a probability that a pixel is within a red-eye, and identifies whether a patch of the image contains a candidate red-eye based on the assigned probabilities;
a classifier which classifies a patch of the digital image in which a candidate red-eye is identified into one of a first class of images and at least one second class of images, the first class being associated with a standard correction of the candidate red-eye, the at least one second class being associated with a modified correction of the candidate red-eye, the modified correction designed to reduce a risk of degradation of the digital image for the second class of images and optionally assigns a level of confidence to the classification; and
a correction component which, based on the classification by the classifier, applies either the modified correction or the standard correction to the candidate red-eye; and
a processor in communication with the memory which executes the instructions.

19. The apparatus of claim 18, wherein the memory stores the digital image during processing.

20. An image processing method comprising:
for each of a plurality of pixels of a digital image, assigning a probability to the pixel of the pixel being in a red eye as a function of a color of the pixel;
identifying whether a patch of the digital image includes a candidate red-eye based on the assigned probabilities of pixels in the patch;
for a patch which is identified as including a candidate red-eye, automatically classifying the patch to a first class of images associated with a standard correction of the candidate red-eye or to at least one of a plurality of second classes of images, each of the second classes being associated with a modified correction of the candidate red-eye, the classifying optionally including determining a confidence level associated with the classification;
where the image is classified into the at least one second class and where the confidence level, where determined, exceeds a threshold value, applying the modified correction to the patch; and
otherwise, applying the standard correction to the patch.

21. A classifier for digital images which takes as input a digital image in which a patch of the image includes a candidate red-eye, the classifier having been trained to identify images for which a modified correction of the candidate red-eye results in less degradation of the patch of the image than a standard correction of the candidate red-eye and to classify the image into either a first class for which the standard correction is to be applied or at least a second class for which the modified correction is applied, the classifier comprising memory which stores instructions for classifying the images and a processing module which executes the instructions.

22. The classifier of claim 21, wherein the second class includes three second classes:
a class which includes images for which the standard correction has a probability of applying a correction to the candidate red-eye in a patch which extends beyond a patch corresponding to a pupil;

a class which includes images for which the standard correction has a probability of generating a pupil of the corrected candidate red-eye with a border which appears more poorly defined than in the original image; and a class which includes images for which the standard correction has a probability of producing a corrected image in which a glint in the corrected candidate red-eye is less apparent than in the original image.

* * * * *